(12) United States Patent
Giess

(10) Patent No.: US 8,736,864 B2
(45) Date of Patent: May 27, 2014

(54) SYSTEM AND METHOD FOR PRODUCING AND INSPECTING PRINTS HAVING STATIC AND VARIABLE CONTENTS

(75) Inventor: Berthold Giess, Eckernförde (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 233 days.

(21) Appl. No.: 13/324,356

(22) Filed: Dec. 13, 2011

(65) Prior Publication Data

US 2012/0147413 A1 Jun. 14, 2012

(30) Foreign Application Priority Data

Dec. 13, 2010 (DE) .......................... 10 2010 054 344

(51) Int. Cl.
*G06K 15/00* (2006.01)
(52) U.S. Cl.
USPC ............................ 358/1.14; 358/1.1; 382/112
(58) Field of Classification Search
USPC .......... 358/1.1, 1.9, 1.14, 400, 401, 434, 437, 358/296; 382/112
See application file for complete search history.

(56) References Cited

U.S. PATENT DOCUMENTS

| 6,508,172 | B2 | 1/2003 | Kusaka |
| 7,955,456 | B2 | 6/2011 | Fischer et al. |
| 2004/0107855 | A1 | 6/2004 | Kizaki et al. |
| 2005/0060639 | A1 * | 3/2005 | Furukawa et al. ............ 715/500 |
| 2006/0201365 | A1 | 9/2006 | Naegele et al. |
| 2010/0188671 | A1 | 7/2010 | Ihme et al. |

FOREIGN PATENT DOCUMENTS

| DE | 10 2005 009 406 A1 | 9/2006 |
| DE | 10 2005 019 533 A1 | 11/2006 |
| DE | 10 2006 012 513 A1 | 9/2007 |
| DE | 10 2006 015 828 A1 | 10/2007 |
| EP | 1 167 034 A2 | 1/2002 |

OTHER PUBLICATIONS

German Patent and Trademark Office Search Report, Dated Sep. 7, 2011.

\* cited by examiner

*Primary Examiner* — Thomas D Lee
(74) *Attorney, Agent, or Firm* — Laurence A. Greenberg; Werner H. Stemer; Ralph E. Locher

(57) ABSTRACT

A system for producing and inspecting prints having static and variable contents includes a printing unit, an inspection unit, and a computation unit. The computation unit integrates print-specific information having static and variable contents in the form of print parameters and inspection parameters into a common JobTicket and routes the JobTicket i) both to the printing unit and to the inspection unit or ii) routes the JobTicket first of all to the printing unit and from the printing unit to the inspection unit, or vice versa. The print parameters are extracted from the common JobTicket and the printing unit uses the extracted print parameters to create prints. The inspection parameters are extracted from the common JobTicket and the inspection unit uses the extracted inspection parameters to inspect the prints.

8 Claims, 2 Drawing Sheets

SYSTEM AND METHOD FOR PRODUCING AND INSPECTING PRINTS HAVING STATIC AND VARIABLE CONTENTS

CROSS-REFERENCE TO RELATED APPLICATION

This application claims the priority, under 35 U.S.C. §119, of German patent application DE 10 201 0 054 344.6, filed Dec. 13, 2010; the prior application is herewith incorporated by reference in its entirety.

BACKGROUND OF THE INVENTION

Field of the Invention

The present invention relates to a system and a method for producing and inspecting prints having static and variable contents.

Print inspection systems are already known in which first of all a comparison pattern needs to be learned by using the camera to record a printed print which is found (by the user) to be visually acceptable and store it as a comparison pattern for later inspection processes. The subsequent prints are then merely compared against the comparison pattern (image comparison). However, this cannot be used to check variable prints. Such inspection systems are therefore able to be used only for checking static contents, i.e. contents which are invariable from print to print.

German published patent application DE 10 2005 019 533 A1 describes a printing machine and a method for the inline manufacture of individualized printed products. This involves the use of an inline printing device and an inline inspection device for error recognition. Erroneous print images need to be identified immediately after printing and associated with an underlying variable print image data record. Such erroneous print images need to be marked and transferred out, for example.

German published patent application DE 10 2006 012 513 A1 discloses an image processing system for a printing machine which is suitable for inspecting static and variable image data. Variable contents can be analyzed using what are known as OCR techniques, for example. This document describes how an evaluation unit for character recognition from a variable image element on a printed product is connected to a data memory for generating the data of the variable image element and how the data from the evaluation unit are matched to the data record which has been used to actuate a variable printer for printing the inspected image element.

SUMMARY OF THE INVENTION

It is accordingly an object of the invention to provide a method and a system for producing and inspecting prints which overcome the above-mentioned disadvantages of the heretofore-known devices and methods of this general type and which provide for a system and a method with simple information management that is improved in comparison with the prior art.

With the foregoing and other objects in view there is provided, in accordance with the invention, a system for producing and inspecting prints having static and variable contents. The system comprises:
  a printing unit configured to produce prints;
  an inspection unit configured to inspect the prints; and
  a computation unit connected to said inspection unit and to said printing unit;
  the computation unit integrating print-specific information having static and variable contents in the form of print parameters and inspection parameters into a common JobTicket and routing the common JobTicket to the printing unit and to the inspection unit;
  wherein the print parameters are extracted from the common JobTicket and the printing unit uses the extracted print parameters to produce prints; and
  wherein the inspection parameters are extracted from the common JobTicket and the inspection unit uses the extracted inspection parameters to inspect the prints.

The computation unit either routes the Jobticket simultaneously to the printing unit and to said inspection unit, or routes the JobTicket first toe to the printing unit and from said printing unit to the inspection unit, or first to the inspection unit and from the inspection unit to the printing unit.

In other words, the system according to the invention for producing and inspecting prints having static and variable contents is a system which includes a printing unit, an inspection unit and a computation unit. The computation unit integrates print-specific information having static and variable contents in the form of print parameters and inspection parameters into a common JobTicket and routes the JobTicket i) both to the printing unit and to the inspection unit or ii) routes the JobTicket first of all to the printing unit and from the printing unit to the inspection unit, or vice versa. The print parameters are extracted from the common JobTicket, the printing unit uses the extracted print parameters to create prints, the inspection parameters are extracted from the common JobTicket, the inspection unit uses the extracted inspection parameters to inspect the prints.

According to one exemplary embodiment, provision may be made for the inspection parameters to be extracted from the common JobTicket using a filter. In this case, the filter (in the form of software) may be programmed such that it reads the relevant inspection parameters from the JobTicket. If the inspection parameters are provided in the JobTicket separately, the filter only needs to read the JobTicket at the relevant location. If the inspection parameters are not provided separately, but rather are provided as a part, particularly a subset, of the print parameters, for example, then the filter needs to use information which stipulates which print parameters additionally also need to be used as inspection parameters. Such information may be provided in the filter itself, but may also be stored in the JobTicket.

According to a further exemplary embodiment, provision may be made for the inspection parameters to be supplied to a queue.

With the above and other objects in view there is also provided, according to the invention, a method for producing and inspecting prints having static and variable contents. The novel method utilizes a printing unit, an inspection unit and a computation unit. The computation unit integrates print-specific information having static and variable contents in the form of print parameters and inspection parameters into a common JobTicket and routes the JobTicket i) both to the printing unit and to the inspection unit or ii) routes the JobTicket first of all to the printing unit and from the printing unit to the inspection unit, or vice versa, the print parameters are extracted from the common JobTicket, the printing unit uses the extracted print parameters to create prints, the inspection parameters are extracted from the common JobTicket, the inspection unit uses the extracted inspection parameters to inspect the prints.

According to one exemplary embodiment, provision may be made for the inspection parameters to be extracted from the common JobTicket using a filter.

According to a further exemplary embodiment, provision may be made for the inspection parameters to be supplied to a queue.

The inspection parameters (both in the system and in the method) may be provided in the JobTicket separately from the print parameters. Alternatively, they may not be provided separately from the print parameters in the JobTicket and may form a subset of the print parameters, for example.

The primary concept of the invention is the software-oriented integration of printing system and inspection system into a workflow and into a control system for a printing machine with the object of being able to check fully variable print contents while an order is printing. A central element in this case is the storage of print layout, contents and inspection parameters in a common data record (JobTicket) and the obtainment of the respectively relevant information for the printing and inspection systems from the JobTicket and hence from the same data source. This process takes place automatically, inline and in real time, i.e. all prints created are checked, including those with variable content. In the extreme case, each print instance, i.e. every single print, may be different.

The inspection of the print image according to the invention advantageously requires no manual setup procedures. According to the invention, it is also advantageously possible to inspect any and any number of variable and static printed objects. The inspection system according to the invention also advantageously works for copy one, i.e. when a single print is printed, because it is not necessary to learn a goods sample.

Other features which are considered as characteristic for the invention are set forth in the appended claims.

Although the invention is illustrated and described herein as embodied in a system and method for producing and inspecting prints having static and variable contents, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. There, elements that correspond to, or are functional equivalents of, one another are each provided with the same reference symbols.

DESCRIPTION OF THE INVENTION

Figure 1:
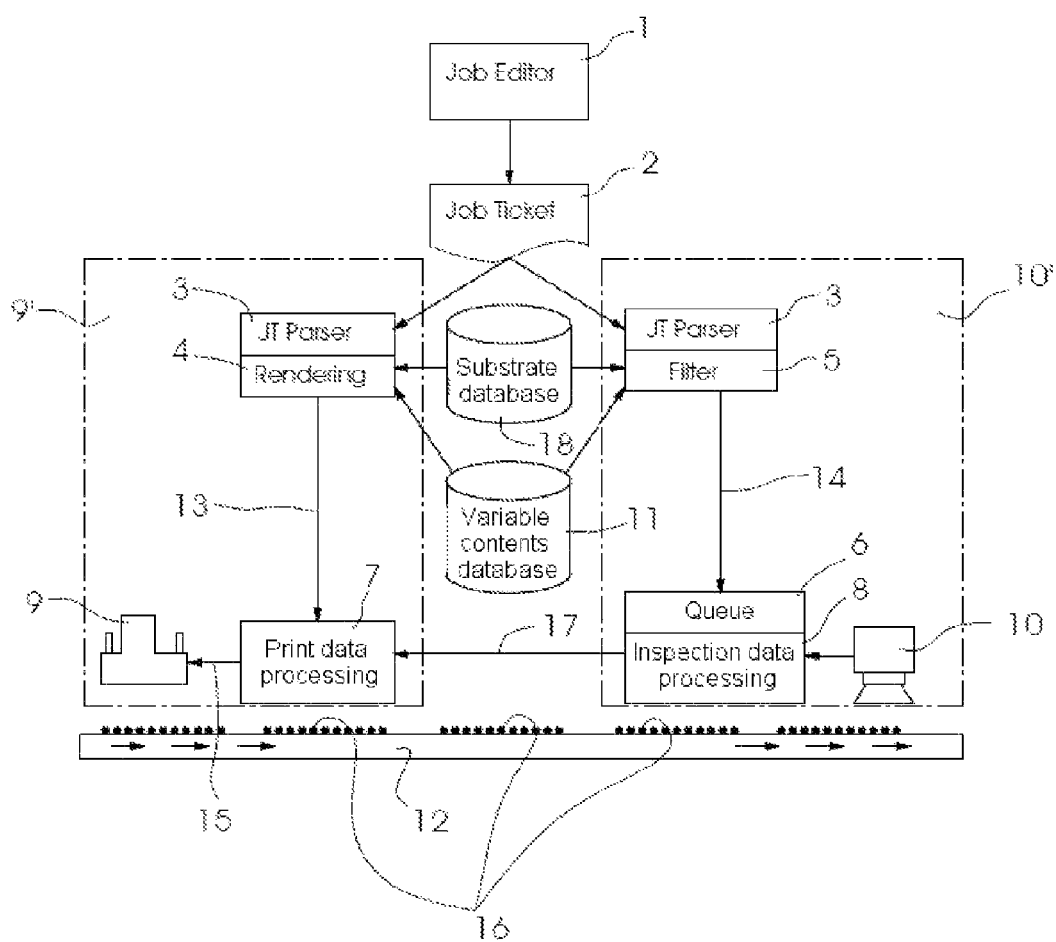
FIG. 1 shows a schematic illustration of a preferred exemplary embodiment of a system according to the invention.

Referring now to the figures of the drawing in detail and first, particularly, to FIG. 1 thereof, there is shown a system according to the invention which includes three primary components, namely, a printing unit 9, an inspection unit 10 and a computation unit 3.

All information relevant to the printing and inspection system is input using the JobEditor 1 and stored as a JobTicket 2. The JobEditor 1, or an appropriate piece of software on a computer, creates the layout and the contents for the print and defines the global and object-specific inspection parameters. All this information is combined in a (one and the same) JobTicket 2 for this print.

The obtainment (recovery) of the inspection parameters from the JobTicket 2 allows the inspection system 10' to be automatically focused on the respective order to be printed or on the individual instances of the print image 15, which are possibly provided with variable contents and/or a variable layout. In this way, i.e. using and reading the JobTicket 2 or at least portions thereof, the inspection system 10' is notified of the contents, the position, the size, the color and the type of the object. Object types are text, graphics, bar codes and 2D codes, for example. The inspection system 10' is sent only such objects as are defined, on the basis of the JobTicket 2, as needing to be checked. The filter 5 ensures that the relevant inspection parameters are extracted from the JobTicket 2. In addition, the JobTicket 2 contains attributes which prompt the inspection system either to check whether an object is identical to the target value or merely to check that something has been printed at the relevant location. For bar codes and 2D codes, quality assessments are, furthermore, also performed. The variable contents are kept in a database 11.

The JobTicket 2 contains all the layout information (e.g. object positions and sizes, font size, styles, orientation, etc.), the print contents in the case of static data, references to static images, the variable names in the case of variable contents, a definition of the data source in the case of variable data and an identification for the substrate.

The JobTicket 2 contains particularly the following information, which is assembled in the course of what is known as composing (19, cf. FIG. 2):

A. Geometry (position and size) of an object to be printed
   B. Orientation of the content within the object field (angle, alignment)
   C. Background, foreground and frame color for an object
   D. Type of the object (e.g. text, image, bar code)
   E. For text: font and font size
   F. For bar code: bar code type
   G. Print content:
      a. Static text (character strings)
      b. Variable text (reference to a data source and field descriptors)
      c. Static images (path to a file)
      d. Variable images (reference to a data source and field descriptors)
      e. Static bar codes and 2D codes (character strings)
      f. Variable bar codes and 2D codes (reference to a data source and field descriptors).

When the print job has been released (e.g. by the operator) for printing, the JobTicket 2 is simultaneously transmitted by a computation unit 3, i.e. via the respective instances of the JobTicket parser 3, to the renderer 4 of the printing system 9' and to the filter 5 of the inspection system. Alternatively, the JobTicket 2 is first of all sent to the printing system 9' and from there to the inspection system 10', or vice versa.

In the printing system 9', the rendering component 4 caters for the generation of the print data (bitmap format) and print parameters 13. In this case, the variable contents for the respective print instance are also read in from the external data source 11 and inserted into the static background plane of the print image. The print data processing 7 caters for the transmission of the instance of the respective print image 15 to the printing unit or printing heads 9 over time and in the exact position. The printing of the bitmap is initiated by a trigger signal "Trigger 1" 20, cf. FIG. 2.

A filter 5 is used to extract the inspection-related information, to convert it and to enter it into a queue 6 (e.g. a FiFo memory). The order of the inspection data and inspection parameters 14 in the queue 6 corresponds precisely to the printing order. The inspection unit 10, or camera, is used to record the print 16 upon reception of a trigger signal "Trigger 2" (21, cf. FIG. 2), and said print is analyzed by the inspection unit or inspection data processing 8 in accordance with the content of the next inspection data record 14 from the queue 6. In this case, the comparator (22, cf. FIG. 2) performs comparison on an object basis (text: OCR/OCV and text comparison; images: pixel comparison; bar code: decode bar code and compare content as text).

If the inspection data processing 8 recognizes an error (difference between recorded, printed image 16 and inspection data record or target data 14, a signal 17 is sent to the printing system with a detailed error message. The printing system then decides on a suitable measure depending on the approach (policy) which is set. This may be one of the following possibilities, for example:

- Ignore the error and transfer the message and identification of the erroneous print 16 to the superordinate control system.
- Transfer out or mark the erroneous print 16 and transfer the message and identification of the erroneous print to the superordinate control system.
- Transfer out or mark the erroneous print 16 and repeat the print by inserting the print order again.
- Stop the printing system, transfer out the erroneous print 16 and repeat the prints 16 between printing head and camera
- Stop printing system if more than n prints 16 are erroneous (e.g. n>2, n>3, n>4, n>5 or n>10)
- Automatic or user-prompted performance of suitable measures for correcting a mechanical cause on the printing head 9.

An inspection system needs to be adapted to suit the characteristic of the respective substrate 12. The parameters for this are stored in the substrate database 18. An ID for the respective substrate 12 is included in the JobTicket 2. The substrate database 18 contains all material-dependent parameters for the printing system and for the inspection system.

Figure 2:
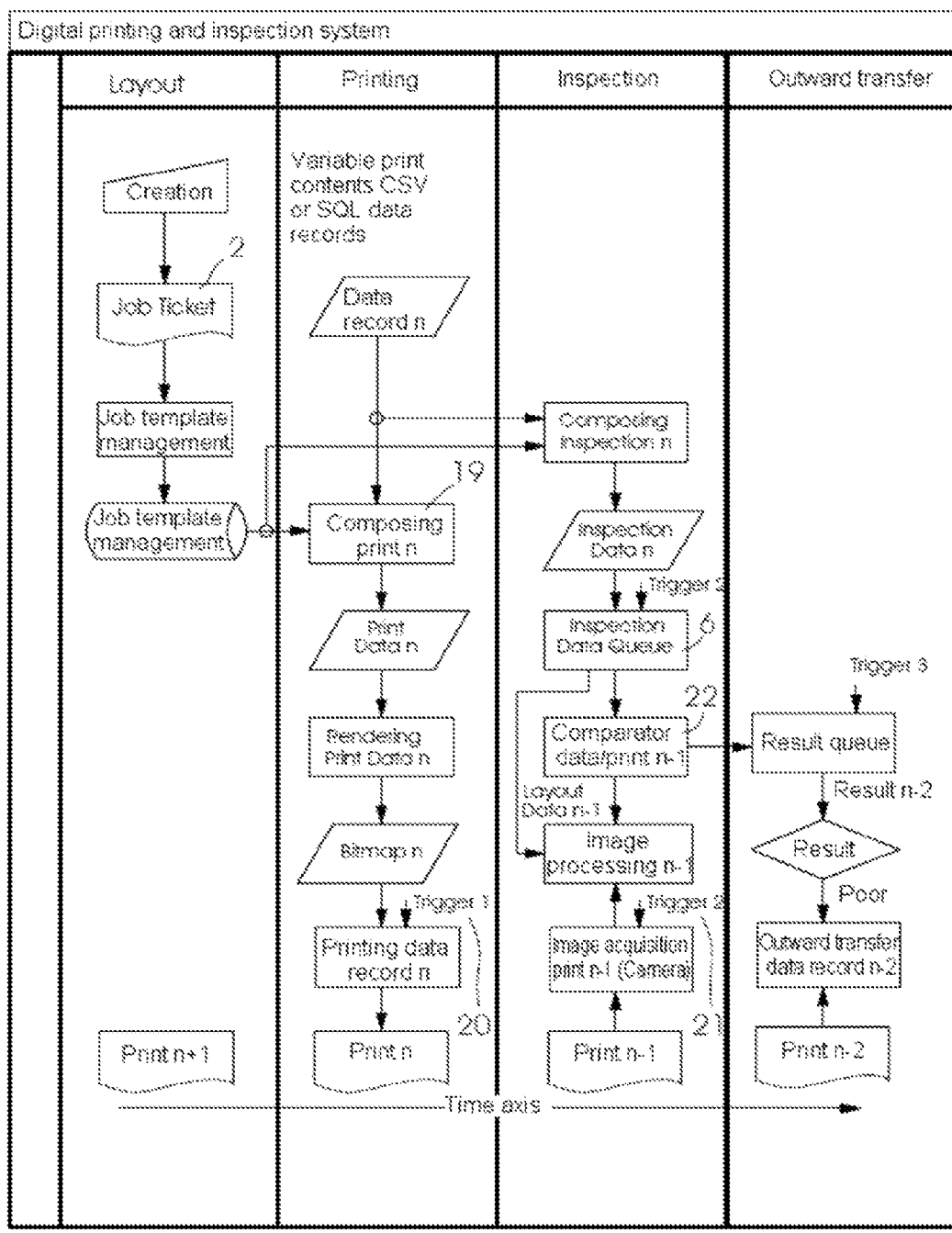
FIG. 2 shows a further schematic illustration of a preferred exemplary embodiment of a method according to the invention.

Referring now to FIG. 2, the process sequence of the method according to the invention is divided into four sections, namely, "layout", "printing", "inspection" and "outward transfer."

In the "inspection" section, which is fundamental to the invention, the inspection data ("Inspection Data") are first of all extracted from the JobTicket 2 (cf. activity of the filter 5 in FIG. 1) and are then supplied to a queue 6 ("Inspection Data Queue"). A comparator 22 compares the extracted or filtered-out inspection data with the image data from the relevant print (e.g. print n–1), which have been recorded by the inspection unit (10, cf. FIG. 1), for errors which exist. Since inspection and printing take place simultaneously, printing the prints with counter n always involves inspection of prints with counter n–1 (or n–2, n–3, . . . ). Since the inspection is intended to take place in real time, the print n–1 is preferably inspected while the print n is being printed.

The invention claimed is:

1. A system for producing and inspecting prints having static and variable contents, the system comprising:
   a printing unit configured to produce prints;
   an inspection unit configured to inspect the prints; and
   a computation unit connected to said inspection unit and to said printing unit;
   said computation unit integrating print-specific information having static and variable contents in the form of print parameters and inspection parameters into a common JobTicket and routing the common JobTicket to said printing unit and to said inspection unit;
   wherein the print parameters are extracted from the common JobTicket and said printing unit uses the extracted print parameters to produce prints; and
   wherein the inspection parameters are extracted from the common JobTicket and said inspection unit uses the extracted inspection parameters to inspect the prints.

2. The system according to claim 1, wherein said computation unit is configured to simultaneously route the JobTicket to said printing unit and to said inspection unit.

3. The system according to claim 1, wherein said computation unit is configured to first route the JobTicket to said printing unit and from said printing unit to said inspection unit, or first route the JobTicket to said inspection unit and from said inspection unit to said printing unit.

4. The system according to claim 1, which comprises a filter and wherein the inspection parameters are extracted from the common JobTicket using a filter.

5. The system according to claim 1, wherein the inspection parameters are supplied to a queue.

6. A method for producing and inspecting prints with static contents and variable contents, the method which comprises:
   providing a printing unit, an inspection unit, and a computation unit;
   integrating, with the computation unit, print-specific information having static contents and variable contents in the form of print parameters and inspection parameters into a common JobTicket;
   routing the JobTicket i) both to the printing unit and to the inspection unit or routing the JobTicket ii) first to the printing unit and from the printing unit to the inspection unit, or routing the JobTicket iii) first to the inspection unit and from the inspection unit to the printing unit;
   extracting the print parameters from the common JobTicket;
   using the extracted print parameters with the printing unit to create prints;
   extracting the inspection parameters from the common JobTicket; and
   using the extracted inspection parameters with the inspection unit to inspect the prints.

7. The method according to claim 6, which comprises using a filter to extract the inspection parameters from the common JobTicket.

8. The method according to claim 6, which comprises supplying the inspection parameters to a queue.

* * * * *